(12) United States Patent
Connolly et al.

(10) Patent No.: US 11,687,468 B2
(45) Date of Patent: Jun. 27, 2023

(54) METHOD AND APPARATUS FOR SECURING MEMORY MODULES

(71) Applicant: International Business Machines Corporation, Armonk, NY (US)

(72) Inventors: Brian J. Connolly, Williston, VT (US); Kyu-hyoun Kim, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 16/919,685

(22) Filed: Jul. 2, 2020

(65) Prior Publication Data
US 2022/0004506 A1    Jan. 6, 2022

(51) Int. Cl.
G06F 12/14    (2006.01)
G06F 1/3225   (2019.01)
H04L 9/08     (2006.01)

(52) U.S. Cl.
CPC ........ *G06F 12/1408* (2013.01); *H04L 9/0822* (2013.01); *G06F 2212/1052* (2013.01)

(58) Field of Classification Search
CPC ......... G06F 12/1408; G06F 2212/1052; H04L 9/0822
USPC ........................................................ 713/193
See application file for complete search history.

(56) References Cited

U.S. PATENT DOCUMENTS

| | | | |
|---|---|---|---|
| 6,636,971 B1 | 10/2003 | Loukianov | |
| 7,200,066 B2 * | 4/2007 | Krenzke | G11C 5/147 |
| | | | 365/189.09 |
| 9,317,429 B2 | 4/2016 | Ramanujan et al. | |
| 9,378,142 B2 | 6/2016 | Ramanujan et al. | |
| 9,535,828 B1 | 1/2017 | McKelvie et al. | |
| 9,600,416 B2 * | 3/2017 | Ramanujan | G11C 11/40615 |
| 2007/0014176 A1 * | 1/2007 | Krenzke | G11C 16/30 |
| | | | 365/189.09 |
| 2008/0024198 A1 * | 1/2008 | Bitonti | H02M 3/07 |
| | | | 327/536 |

(Continued)

FOREIGN PATENT DOCUMENTS

CN    110612517 A    12/2019

OTHER PUBLICATIONS

Le Zhang; PCKGen: A Phase Change Memory Based Cryptographic Key Generator; IEEE: 2013; pp. 1444-1447.*

(Continued)

*Primary Examiner* — Monjur Rahim
(74) *Attorney, Agent, or Firm* — Scully, Scott, Murphy & Presser, P.C.

(57) ABSTRACT

A memory system for storing data that includes providing a memory module having one or more memory devices and a voltage regulator for controlling voltage levels supplied to the one or more memory devices, wherein the voltage regulator has a first state that permits write and read operations with the one or more memory devices, and a second state where the voltage regulator prevents at least read operations with the one or more memory devices the system configured to store an encryption key in ROM on the voltage regulator; copy the encryption key value from the ROM to a voltage regulator register; set a voltage regulator encryption timer for a period of time; and transition the voltage regulator to the second state in response to the voltage regulator encryption timer expiring.

20 Claims, 9 Drawing Sheets

(56) References Cited

U.S. PATENT DOCUMENTS

| | | | | |
|---|---|---|---|---|
| 2009/0083202 A1* | 3/2009 | Tanaka | ............... | G06N 3/063 |
| | | | | 706/15 |
| 2014/0047246 A1* | 2/2014 | Seol | ............... | G06F 21/79 |
| | | | | 713/193 |
| 2015/0243352 A1* | 8/2015 | Park | ............... | G11C 13/0004 |
| | | | | 365/163 |
| 2017/0371695 A1* | 12/2017 | Sanjeepan | ............. | G06F 3/0619 |
| 2018/0090211 A1* | 3/2018 | Pao | ............... | G11C 16/225 |
| 2019/0221139 A1* | 7/2019 | Schrijen | ............... | H04L 9/0866 |
| 2019/0294826 A1* | 9/2019 | Obara | ............... | H04L 9/0822 |
| 2020/0150734 A1* | 5/2020 | Ma | ............... | G06F 1/3243 |
| 2021/0149823 A1* | 5/2021 | Palmer | ............... | G06F 3/0623 |
| 2021/0281398 A1* | 9/2021 | Mardinian | ............ | G07F 7/1016 |

OTHER PUBLICATIONS

International Search Report dated Aug. 27, 2021, received in a corresponding foreign application, 9 pages.

Young et al. "DEUCE: Write-Efficient Encryption for Non-Volatile Memories." http://dx.doi.org/10.1145/2694344.2694387. Mar. 14-18, 2015. 12 pages.

Anonymous. "Persistent Memory Device with Hardware-Enforced Write Control for Secure Logging." http://ip.com/IPCOM/000228185D;. Jun. 11, 2013. 7 pages.

IBM. "Persistent Server: Continous Memory and CPU State Protection (for power fails)" http://ip.com/IPCOM/000171433D. Jun. 9, 2008. 2 pages.

IBM. System & Method of DeStage of Write Cache Data in NVRAM DIMMs. http://ip.com/IPCOM/000167469D;. Feb. 14, 2008. 2 pages.

\* cited by examiner

METHOD AND APPARATUS FOR SECURING MEMORY MODULES

BACKGROUND

The present invention relates to computer or information handling systems, processors and memory subsystems, and more specifically to securing memory subsystems from unauthorized access.

With recent advancement of information technology and wide use of the internet to store and process electronic information and data, more and more demands are placed on the acquisition, processing, storage, and dissemination of information by computing systems. Computing systems are being developed to increase the speed at which computers are able to execute increasingly complex applications for business, personal use, and entertainment. Overall computer system performance is affected by each of the key elements of the computer structure, including the performance, efficiency, and structure of the processors, any memory caches, input/output (I/O) subsystems, memory control functions, memory devices and subsystems, and any associated memory interface or interconnect elements.

The constantly increasing speed of processors which execute increasingly complex applications places more rigorous performance demands on all of the other subsystems in the computer, including the memory subsystem, where data is stored, accessed, and updated numerous times during the operation of an application or program. The memory subsystem of most computers is normally operated and controlled by a memory controller. In many memory subsystems, the memory controller may control multiple memory devices. The memory devices may be arranged in ranks and/or channels.

Computer systems such as servers, desktop and laptop computers are typically designed with memory subsystems configured as memory modules, including industry standard (IS) DIMMs (ISDIMMs). A computer's memory subsystem often comprises one or more memory modules, usually one or more DIMMs that each include several memory devices, e.g., dynamic random access memory (DRAM) devices. DIMMs may have one or more ranks and channels of memory devices. The one or more memory devices on the memory module contain information and data, and can contain confidential, sensitive, and/or personal information that is subject to hacking, or non-secure access. These non-secure, unauthorized, accesses can abscond with valuable and/or sensitive information. It would be advantageous to provide security measures, techniques and/or systems to protect such memory subsystems and modules from unauthorized access.

SUMMARY

The summary of the disclosure is given to aid understanding of information handling systems, processors, and memory systems, their architectural structures, and methods of securing access to information, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the information handling systems, processors, memory systems, their architectural structures, and methods of operation to achieve different effects.

In one or more embodiments, a method, technique, and/or memory system for storing data is disclosed that includes providing a memory module having one or more memory devices for storing data and a voltage regulator for controlling voltage levels supplied to the one or more memory devices, wherein the voltage regulator has a first state that permits write and read operations with the one or more memory devices, and a second state where the voltage regulator prevents at least read operations with the one or more memory devices; storing in read only memory on the voltage regulator an encryption key value; copying the encryption key value from the read only memory on the voltage regulator to a voltage regulator register; setting a voltage regulator encryption timer for a period of time; and transitioning the voltage regulator to the second state in response to the period of time of the voltage regulator encryption timer expiring. In an aspect, the method and/or system further includes receiving by the voltage regulator a host encryption key from a system remote from the memory module; comparing the host encryption key to the encryption key value in the voltage regulator register; and in response to the host encryption key matching the encryption key value, re-setting the voltage regulator encryption timer so that the voltage regulator remains in the first state. The method and/or system further including, in response to the host encryption key not matching the encryption key value, not resetting the voltage regulator encryption timer. In an embodiment, in response to transitioning to the second state, the voltage regulator changes the voltage level supplied to the one or more memory devices to a low voltage level state rendering the data on the one or more memory devices unaccessible. A voltage regulator controller in an aspect changes the voltage level supplied by the voltage regulator to the one or more memory devices to the low voltage level state. According to an embodiment, one or more of the one or more memory devices is volatile memory, and in response to transitioning to the second state, the data in the one or more volatile memory devices is saved to non-volatile memory.

The method and/or system further includes in an aspect, while the voltage regulator is operating in the second state, determining whether the voltage regulator receives a host encryption key from a system remote from the memory module; comparing the host encryption key to the encryption key value in the voltage regulator register; and in response to the host encryption key matching the encryption key value, transitioning the voltage regulator to the first state. In response to transitioning the voltage regulator to the first state, the voltage level supplied by the voltage regulator is changed to a second voltage level state that permits read and write operations with the one or more memory devices. According to an embodiment, in response to transitioning the voltage regulator to the first state, the voltage regulator re-sets the voltage regulator encryption timer, and in an aspect, in response to transitioning the voltage regulator to the first state, resetting a recovery bit to return the voltage regulator to the second voltage level state. On system set-up, loading the encryption key into the voltage regulator read only memory and storing the matching encryption key value in a location remote from the memory module; and programming the time period for the voltage encryption timer.

A memory system for storing data is disclosed, the memory system including: a memory module having at least one memory device configured to store data, the memory module having a voltage regulator having circuitry and logic for supplying voltage levels to the at least one memory device to control reading and writing operations to the at least one memory device wherein the voltage regulator has a first state that permits write and read operations with the at least one memory device, and a second state where the voltage regulator prevents at least read operations with the at least one memory device. The voltage regulator in an aspect includes read only memory to store an encryption key; a voltage regulator register for receiving and storing the encryption key from the read only memory; an encryption timer for setting a time period; a voltage regulator secure controller for controlling voltage levels supplied to the at least one memory device and having logic for comparing an encryption key value received by the voltage regulator to the encryption key in the voltage regulator register; wherein the voltage regulator is configured to: store in read only memory on the voltage regulator the encryption key value; copy the encryption key value from the read only memory on the voltage regulator to the voltage regulator register; set the voltage regulator encryption timer for the period of time; and transition the voltage regulator to the second state in response to the period of time of the voltage regulator encryption timer expiring. In an aspect, the voltage regulator is further configured to: receive a host encryption key from a system remote from the memory module; compare the host encryption key to the encryption key value in the voltage regulator register; and in response to the host encryption key matching the encryption key value, re-setting the voltage regulator encryption timer so that the voltage regulator remains in the first state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and embodiments of information handling systems, processors, and memory subsystems, their architectural structures and its methods of operation will be better understood when read in conjunction with the figures provided. Embodiments are provided in the figures for the purpose of illustrating aspects, features, and/or various embodiments of information handling systems, processors, memory subsystems, their architectural structures, and methods of operation, but the claims should not be limited to the precise arrangement, structures, assemblies, subassemblies, functional units, circuitry, features, aspects, embodiments, devices, mechanisms, methods, processes, or techniques shown, and the arrangements, structures, assemblies, subassemblies, functional units, circuitry, features, aspects, embodiments, devices, mechanisms, methods, processes, and techniques shown may be used singularly or in combination with other arrangements, structures, assemblies, subassemblies, functional units, circuitry, features, aspects, embodiments, devices, mechanisms, methods, processes, and techniques.

DETAILED DESCRIPTION

The following description is made for illustrating the general principles of the invention and is not meant to limit the inventive concepts claimed herein. In the following detailed description, numerous details are set forth in order to provide an understanding of information handling systems, processors, memory systems, their architectural structures, and methods of operation, however, it will be understood by those skilled in the art that different and numerous embodiments of information handling systems, processors, memory systems, their architectural structures, and methods of operation may be practiced without those specific details, and the claims and invention should not be limited to the arrangements, structures, embodiments, assemblies, subassemblies, features, functional units, circuitry, processes, methods, aspects, features, or details specifically described and shown herein. Further, particular features, aspects, and embodiments described herein can be used in combination with other described features, aspects, and/or embodiments in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

Figure 1:
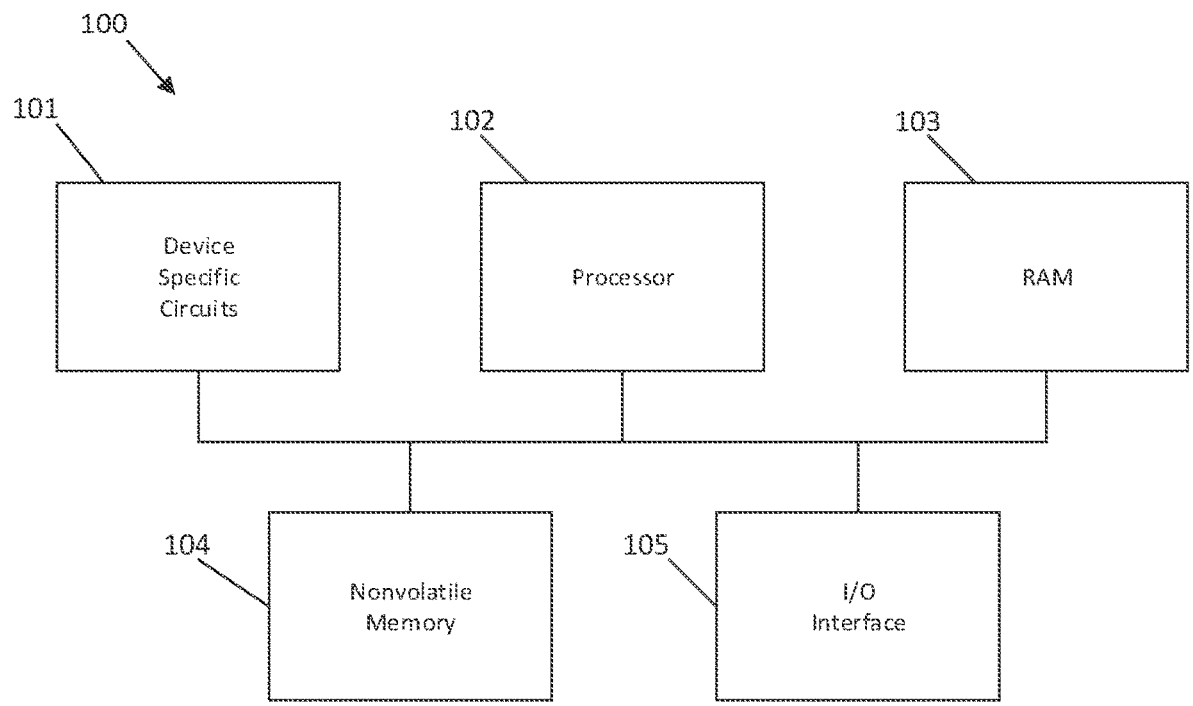
FIG. 1 depicts a general computing or data processing system.

A computing or information handling (data processing) system 100 suitable for storing and/or executing program code may take many forms and in one embodiment may include at least one processor 102, which may be or be part of a controller, coupled directly or indirectly to memory devices or elements through a system bus 106, as shown in FIG. 1. Computing or information handling system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc. The RAM 103 is typically used to hold variable data, stack data, executable instructions, etc., and may contain confidential or sensitive data. RAM 103 may include Dynamic Random Access Memory or DRAM. In one embodiment, the RAM 103 may comprise Double Data Rate (DDR) synchronous DRAM or SDRAM. The RAM 103 may include memory devices arranged on a module, such as, for example, Dual Inline Memory Modules, also known as DIMMs.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
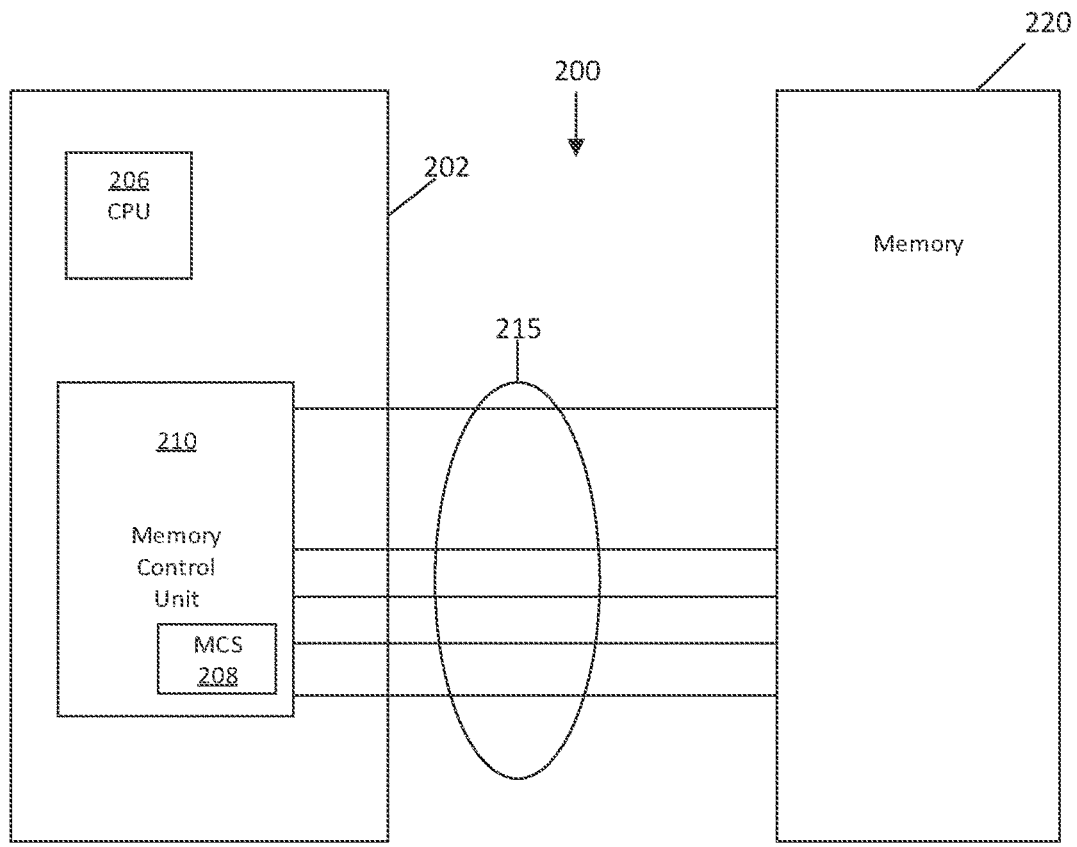
FIG. 2 depicts a computing or processing system including a memory subsystem in accordance with one embodiment.

FIG. 2 depicts an exemplary processing system 200 that may be part of a larger computer or information handling system structure or network. The processing system 200 includes a control processor system or processor 202, which is a processing subsystem that includes at least one processor unit (CPU) or microprocessor 206 that may be configured to interface with a Memory Control Unit (MCU) 210. The processor or CPU 206 may be a module that processes read, write, and configuration requests from a system controller (not depicted). The processor 206 may be a multi-core processor. The MCU 210 may include a memory controller synchronous (MCS) 208, also referred to as a memory controller, that controls communication with one or more memory devices 250 in a memory subsystem 220. The MCU 210 and the MCS 208 may include one or more processing circuits, or processing may be performed by or in conjunction with the processor 206. The control processor system 202 communicates with the memory subsystem 220 through a communications bus 215. Control processor system 202, processor or CPU 206, memory control unit (MCU) 210, and MCS 208, individually and collectively, may be referred to herein as the Host. The Host as used herein is used broadly to refer to a processor, controller or device that sends and receives command and/or control signals to a memory system or memory subsystem. The Host typically also sends and receives data (signals) from a memory system or subsystem.

Systems, architectures, and/or methods of managing and securing data are disclosed, and in an aspect a system, architecture, and/or method of preventing unauthorized access to data on a memory module. In an embodiment, a system, architectural structure, and/or method of using an encryption key sent to and received by the memory subsystem is disclosed, and in an aspect the encryption key is sent by the Host to memory subsystem. In one or more embodiments if the memory subsystem does not receive the encryption key, it shuts down power and does not permit access to the memory subsystem.

Figure 3:
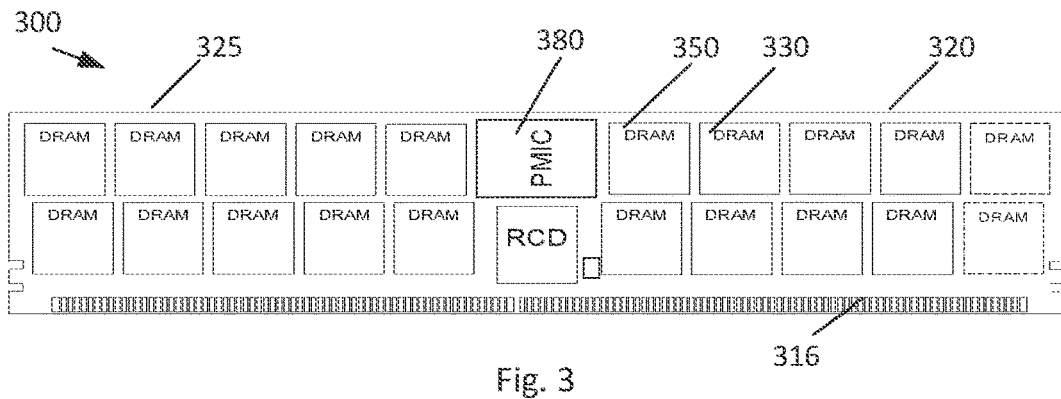
FIG. 3 depicts a memory subsystem in accordance with an embodiment.
Figure 4:
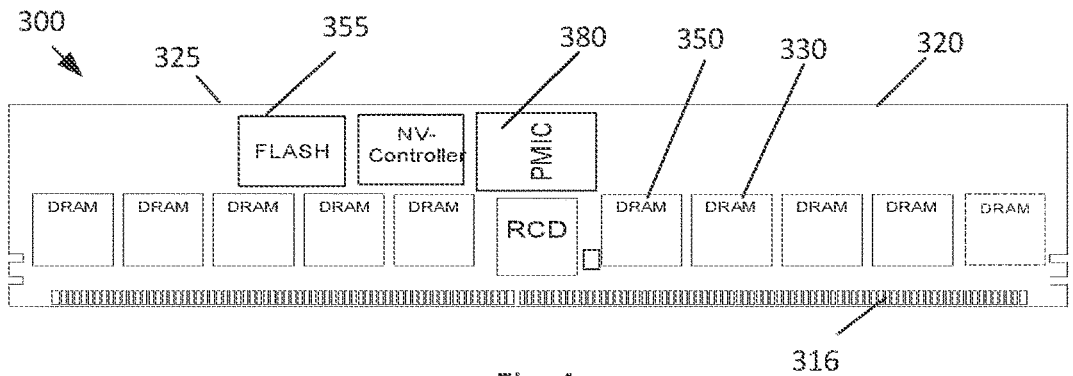
FIG. 4 depicts a memory subsystem in accordance with an embodiment.
Figure 5:
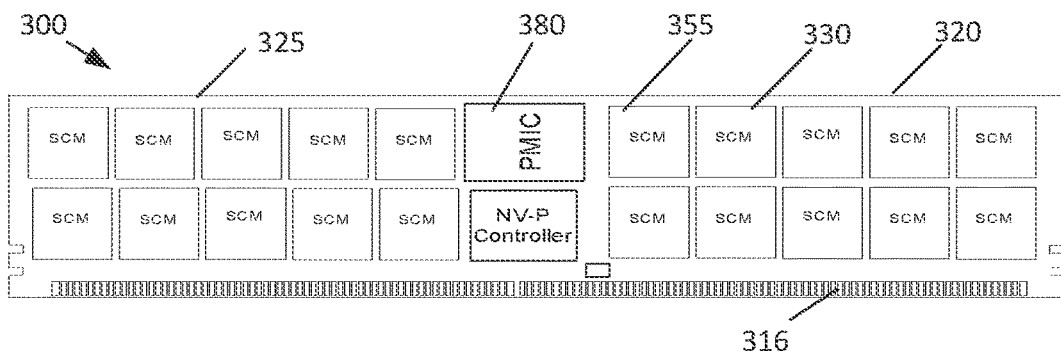
FIG. 5 depicts a memory subsystem in accordance with an embodiment.
Figure 6:
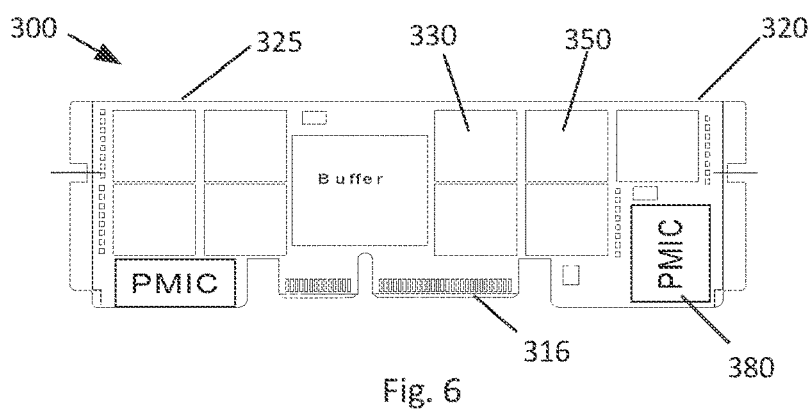
FIG. 6 depicts a memory subsystem in accordance with an embodiment.
Figure 7:
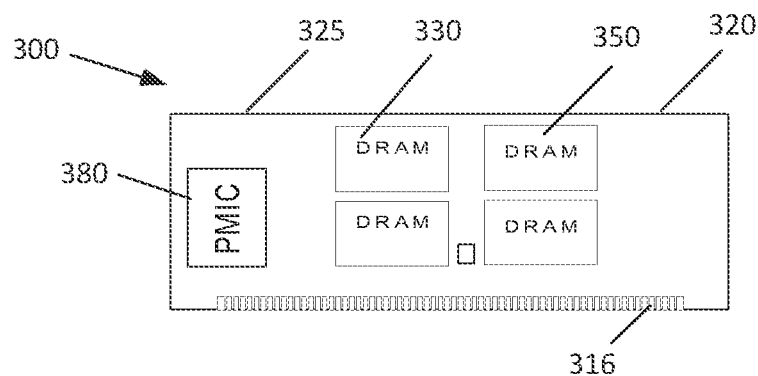
FIG. 7 depicts a memory subsystem in accordance with an embodiment.

FIGS. 3-7 show examples of a memory subsystem 300 on which embodiments of the disclosure may be practiced. FIGS. 3-7 shows memory system 300 as a memory module 325, e.g., a Dual Inline Memory Module or DIMM 320, but it will be appreciated that memory subsystem 300 may contain more or less memory modules 325, e.g., DIMMs 320, and usually has a number of DIMMs 320. Each memory module 325 may contain one or more memory devices 330, and usually contains a number of memory devices 330. The memory module(s) 325 in one or more embodiments contains circuitry and logic to manage and store data including performing read and write operations to the one or more memory devices. FIG. 3 shows a RDIMM configuration, FIG. 4 shows a NVDIMM type N, FIG. 5 shows a NVDIMM type P, FIG. 6 shows a Differential DIMM and FIG. 7 shows a SODIMM. System. The DIMMs 320 in FIGS. 3-4 and 7 contain one or more volatile memory devices 350, e.g., DRAMs 350. The DRAMs 350 are preferably Double Data Rate (DDR) synchronous DRAMs 350. The DIMMs 320 may contain non-volatile memory devices 355, including Flash or storage class memory (SCM) 355. FIGS. 3-7 show DIMMS 320 with an architecture consistent with DDR5. The memory system architecture may be formatted and structured to support DDR4, DDR5, although the methods, systems, and architecture disclosed and taught would be applicable to other configurations, including future standards.

The memory devices 330 may be integrated circuits or chips and form the basic memory cells that hold bits of information. The memory cells in a memory device 330, e.g., DRAM 350, are usually arranged in banks, where each bank is an array of rows and columns. The memory devices 330 typically have a bit width of 4, 8 or 16, which is indicated by the designation x4, x8, or x16. Often, the memory devices 330 are arranged in ranks or channels, so that a cycle reads or writes to multiple memory devices during the cycle. A rank or channel is generally a set of memory devices 330 that respond to the same command and same address at the same time with different pieces of requested data.

Figure 8:
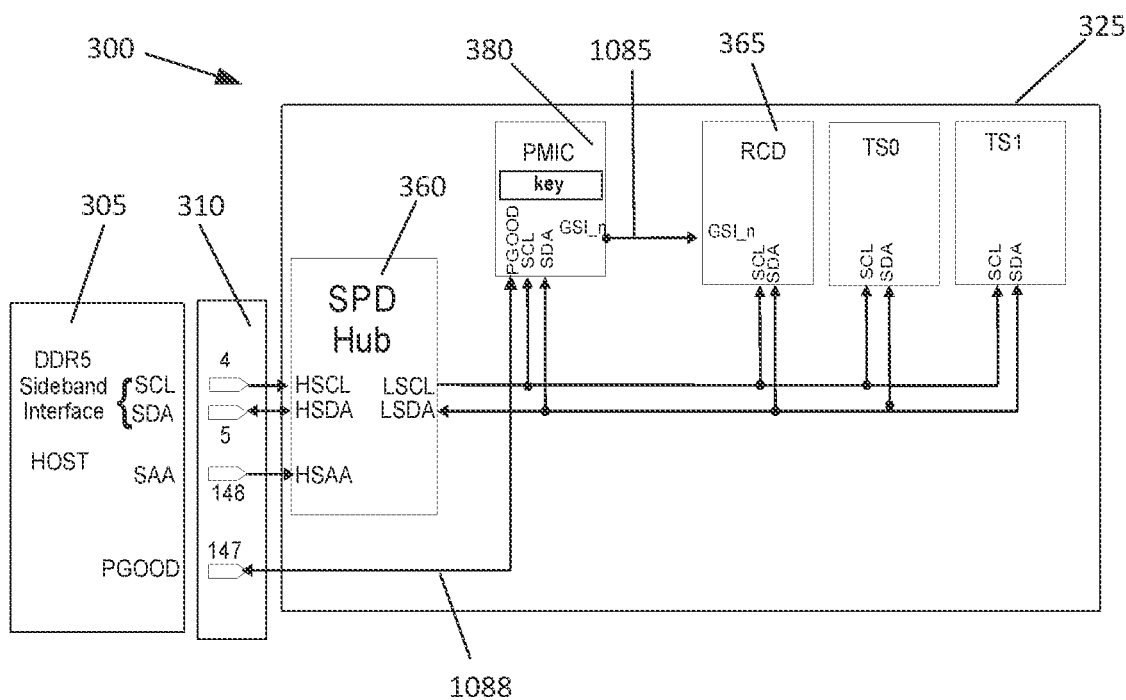
FIG. 8 depicts an information handling system in accordance with an embodiment.
Figure 9:
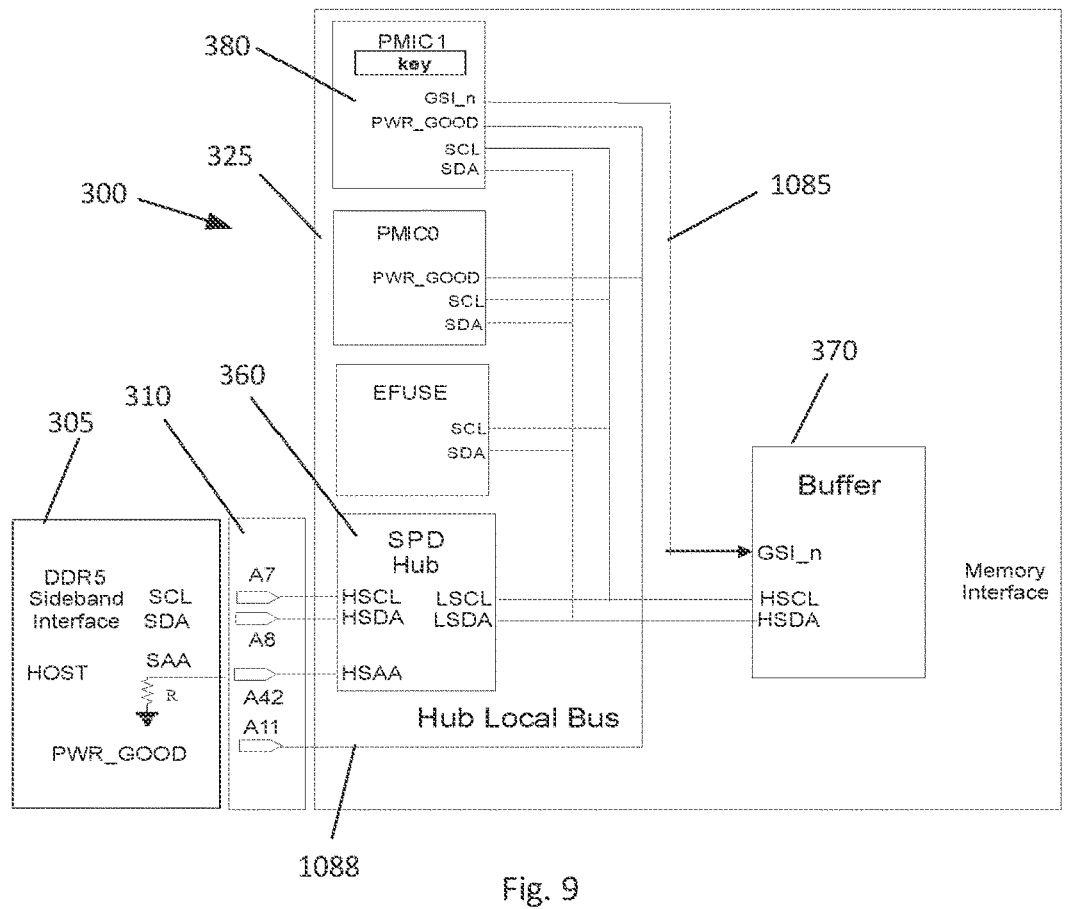
FIG. 9 depicts an information handling system in accordance with an embodiment.

The memory or data storage system 300 may be configured to store data and to provide storage services to one or more hosts, e.g., processors, which can be connected to the storage system 300 directly or through a network (e.g., over the internet). The memory subsystem 300 may include an interface shown in FIG. 8-9 for supporting communications and data exchanged with the Host 305. For ease of illustration the interface between one memory module 325, e.g., DIMM 320, and the Host 305 is shown in FIGS. 8-9, although it should be appreciated that the Host 305 typically interfaces and communicates with numerous memory modules 325. In FIGS. 8-9, pin sockets 310 receive the memory modules 325, e.g., DIMMs 320. For ease of illustration there are shown only a couple of the connections, namely the Power Good signal connection 1088, the SCL connection, the SDA connection, and the SAA connection, between the Host 305, pin socket 310, and memory module 325. Not shown are the connections, interfaces, and buses for transmitting data and control and command communications between the Host 305 and the memory module 325. FIG. 8 shows an interface and memory module 325 consistent with DDR5 RDIMMs, LRDIMMs, NVDIMMs type N, NVDIMMs type P, and SODIMMs and shows only some of the components on memory module 325 including a SPD hub 360, a Register Clock Driver (RCD) 365, and a voltage regulator module (VRM) 380, also known as a Power Management Interface Controller or PMIC 380. FIG. 9 shows an interface and memory module 325 consistent with DDR5 and DDR4 DDIMMs and shows only some of the components on a memory module 325 including SPD hub 360, voltage regulator module (VRM) or PMIC 380, and Buffer 370.

Power is supplied to the memory module 325 by a voltage regulator associated with the processor side or Host side of the information system. The voltage regulator preferably is external to and not mounted on the memory module 325. The voltage regulator may be on a system board, mother board, server back plane or otherwise associated with the Host. The voltage regulator may supply one or multiple voltages to the memory module 325. The voltage regulator in one embodiment preferably supplies twelve (12) volts and 3.3 volts to the memory modules 325. Depending upon the design and configuration of the system, other voltages may be used and the voltage regulator may supply other or multiple voltages to the memory modules 325. Power from the voltage regulator is supplied to the memory module 325 through the module pin socket or connector 310 (shown in FIGS. 9-10). The pin socket 310 has a set of pins that make contact with contact pads 316 on the modules 325. (See FIGS. 3-7). One or more of the pins in the socket 310 may be used to supply voltage/power to the memory module 325.

A voltage regulator module or PMIC 380 is mounted on the memory module 325 as shown in FIGS. 3-9. Power, e.g., voltage, supplied to the memory module 325 may be supplied to PMIC 380 on the memory module 325. PMIC 380 provides voltage regulation to the memory module 325, including the memory devices 330, e.g., the DRAM, Flash, and/or SCM, the RCD 365, and I2C components (e.g., SEEPROM, Temperature Sensor and Media Controller). The on-board PMIC 380 outputs one or more different, regulated voltage levels. The PMIC 380 contains circuitry and logic to control and regulate the voltage levels supplied to the memory devices 330, and other memory module components. While FIGS. 3-5 and 7-8 illustrate only one on-board PMIC 380, additional PMICs 380 as illustrated in FIGS. 6 and 9 can be provided on the memory modules 325 to supply the appropriate voltage (power) to the various components on the memory module 325, including the memory devices 330.

In one or more embodiments a system and/or technique to prevent unauthorized or non-secure access to a memory subsystem, e.g., one or more memory modules each having one or more memory devices is disclosed. In an embodiment, if an encryption key is not received by the memory module within a period of time, the memory module changes to a low power state to prevent data access. The system and/or technique in one or more embodiments will utilize the PMIC's programmable timer with the processor to create a synchronized secure memory module. The processor is synchronized with the memory module when the processor sends periodic write cycles to an encryption key address on the PMIC. The PMIC in an aspect will rearm or reset the PMIC's encryption timer each time the PMIC receives the encryption key. As long as the PMIC receives the proper encryption key within the time period of the PMIC's encryption timer, the memory remains operational. If the PMIC does not receive the encryption key, after an allotted time the PMIC will send a signal to prevent any further accesses to the memory devices on the memory module. The PMIC in one or more embodiments can power down the memory module or put the memory module in a low power state. The PMIC in an aspect signals the processor that the memory module is locked out due to a non-secure or unauthorized access. To prevent the memory module from entering the low power mode or power down mode, or to take the memory module out of the low power or power down mode, the PMIC will have to receive the encryption key to the key register on the memory module. In one or more embodiments, the encryption key is received from a unit remote from the memory module, e.g., from a Host/processor, and in an aspect the processor/Host writes the encryption key to the memory module.

Figure 10:
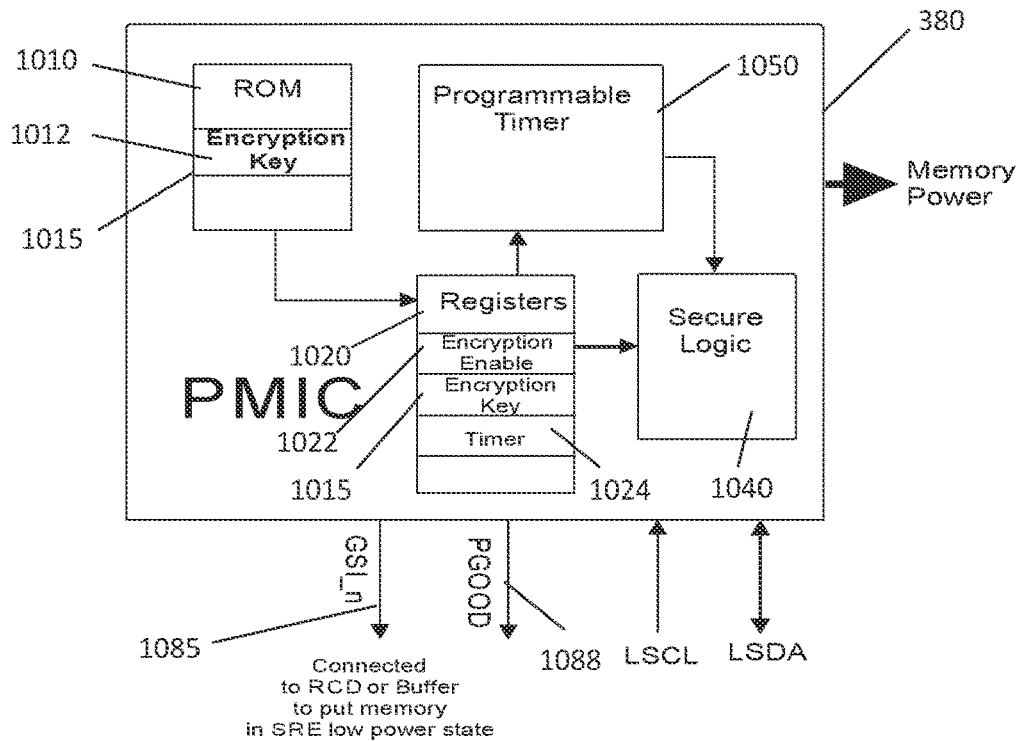
FIG. 10 depicts a memory module voltage regulator, also referred to as power management interface controller (PMIC), in accordance with an embodiment.

FIG. 10 shows representative PMIC 380 which is provided on one or more memory modules, including for example the DIMMS on FIGS. 3-9. PMIC 380 in one or more embodiments includes Read Only Memory (ROM) circuitry 1010. A portion of the PMIC's ROM 1010 includes an addressable register 1012, preferable a 2-byte addressable register field or entry 1012, used to store an encryption key value. The contents of addressable register 1012 are unreadable to the user. In an embodiment, the encryption key value 1015 is programmed into the addressable register 1012 in ROM 1010 during system manufacturing test when the memory module is seated in the system before shipping to a client. On power-up of the PMIC 380, the contents of the addressable register 1012 in ROM 1010, including the encryption key 1015, are moved into the PMIC's register space 1020. In one or more embodiments, the PMIC's encryption key value 1015 in the PMIC register 1020 is not enabled until the system configures the PMIC timer and the Host sets the Encryption Enable bit 1022 in PMIC register 1020. Once the Host sets the Encryption Enable bit 1022, the Host has to start the cadence of sending the encryption key to the memory module, and more specifically to the PMIC 380 in the memory module. The comparison of the encryption key sent by the Host, to the encryption key value 1015 held in the PMIC Register 1020 is performed in the Secure Logic Unit or Secure Controller 1040. The PMIC 380 will rearm the PMIC's encryption timer 1050 each time the encryption key value 1015 is received by the PMIC register 1020. If the PMIC 380 does not receive the encryption key value 1015 within the allotted time, which can be predefined and include re-tries, the PMIC 380 will send a signal to prevent any further accesses to the memory devices 330. In one or more embodiments, once the encryption key is enabled, e.g., the encryption enable bit is enabled, the PMIC Secure Controller 1040 can prevent non-secure accesses to the memory module 325 by controlling the voltage sources for the memory devices 330 and signifying to the processor/Host that the memory module 325 is in a non-secure state.

In one or more embodiments, if the PMIC 380 does not receive an encryption key after an allotted time, in an aspect the PMIC sends a GSI_N signal 1085 to the RCD 365 or Buffer 370, depending upon the type of memory module, to force the memory device into Self-Refresh and prevent any further accesses to the memory device. After a specific amount of time, the PMIC 380 can either power down the memory module or put the memory module into a low power state. Thereafter, in an aspect, the PMIC will drive the Power Good signal 1088 low to signify to the processor that the memory module 325 is locked out due to a non-secure or unauthorized access. To move the PMIC 380 out of the low power or power down mode, the PMIC 380, and in an aspect the PMIC register 1020, will need to receive, e.g., from the processor/Host, the encryption key value 1015. In response to receiving the encryption key value 1015 that matches the value in the PMIC register 1020, the PMIC 380 will signal the RCD 365 by releasing the GSI_N signal 1085 to take the memory device(s) 330 out of the Self Refresh (SRE) mode.

For NVDIMM type N, shown in FIG. 4, during the power down cycle the contents of the DRAM memory devices 350 are transferred and stored in the non-volatile Flash memory 355. Upon re-powering the NVDIMM type N memory module 325, the contents and data are automatically transferred from the non-volatile flash memory 355 to the DRAM memory devices 350, preferably without processor intervention. In an embodiment, the system can be programmed to allow the non-volatile flash memory 355 to transfer the data to the DRAM memory devices 350 in response to the encryption key value being received by the PMIC 380, and/or prevent powering up the memory devices 330 until the encryption key value 1015 is received by the PMIC 380. For the situation where the PMIC 380 permits the media controller to transfer the contents of the non-volatile flash memory 355 back into the DRAM memory devices 350, the PMIC can prevent system accesses by signaling the processor/host with the Power Good signal 1088 asserted low. For NVDIMM P type, shown in FIG. 5, the PMIC 380 would signal the RCD or Buffer to hold down the Power Good signal until the PMIC register 1020 receives the matching encryption key value 1015. Once the encryption key value is received and the PMIC is rearmed, PMIC 380 could activate the memory module 325 for normal operations.

The processor or Host can store the encryption key value anywhere in the system where the system can access the encryption key value upon power up. In one or more embodiments the encryption key data can be stored in pieces across the system and in different parts of the processor registers. In an aspect, the encryption key should be shared with the system owner to permit the owner to change the encryption key, for example to change the encryption key periodically for maintaining cybersecurity protocol. In one or more aspects, the encryption key can be deactivated by repowering the system and reconfiguring the memory module 325.

Figure 11:
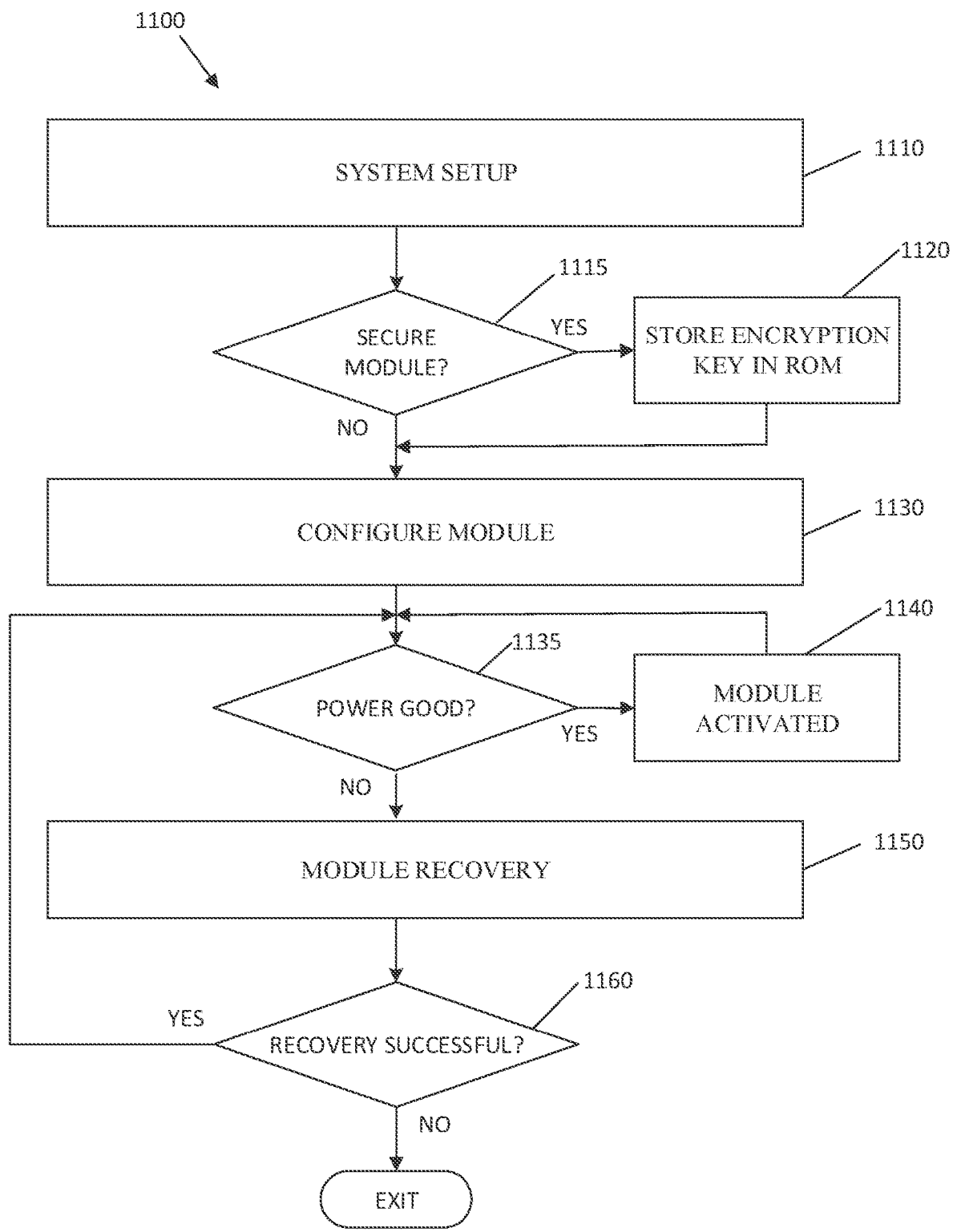
FIG. 11 is a flow diagram of a method according to an embodiment of securing the contents of a memory module from unauthorized access.

FIG. 11 is an exemplary flowchart in accordance with one embodiment illustrating and describing a method of operating an information system to prevent unauthorized or unsecure access to the memory modules, for example DIMMS, in accordance with an embodiment of the present disclosure. While the method 1100 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 11, but the process may be integrated and/or one or more steps may be performed together, simultaneously, or the steps may be performed in the order disclosed or in an alternate order.

An embodiment of a method 1100 of securing a memory module and preventing unsecured access is shown in FIG. 11 and starts at 1110 with plugging the memory module into a pin connector and powering up the PMIC input voltages, e.g., supplying 3.3 volts and 12 volts. At 1115 a determination is made as to whether or not the module is a secure memory module. If the memory module is not a secure module (1115: No), then the process continues to 1130. If the memory module is a secure module (1115: Yes), then the process continues to 1120 where the encryption key is stored in the memory module. In an embodiment, at 1120 the encryption key contents/value is loaded into the PMIC's Read Only Memory (ROM) space 1020 and the Host stores the encryption key in the Host side of the system (not in the memory module). The process of 1110-1120 is performed to set-up the system and memory module and is generally not performed again until desired or required to change the encryption key.

At 1130 the memory module is configured. The process at 1130 of configuring the memory module is shown in greater detail in process 1200 in FIG. 12. After the memory module is configured, which happens after system set-up and when the system is powered up, the process continues to 1135 where it is determined whether or not the power is good. If the power is good (1135: Yes), then the system proceeds to stage 1140 where the module is activated. The process of stage 1140 where the module is activated is explained in greater detail in process 1300 in FIG. 13. The module activated mode is where the memory module is operational provided the encryption key is received by the PMIC, but will transition to an inoperable mode if the encryption key is not received. If the power is not good (1135: No), then the system proceeds at 1150 to a Module Recovery stage. The module recovery stage at 1150 is explained in more detail in process 1400 in FIG. 14. After the module recovery stage at 1150, process 1100 proceeds to 1160 where it is determined whether or not the recovery was successful. If at 1160, the recovery is successful (1160: Yes), then the process 1100 proceeds back to 1135 where it is determined whether the power is good. If at 1160 the recovery is not successful (1160: No), then the system shuts down.

Figure 12:
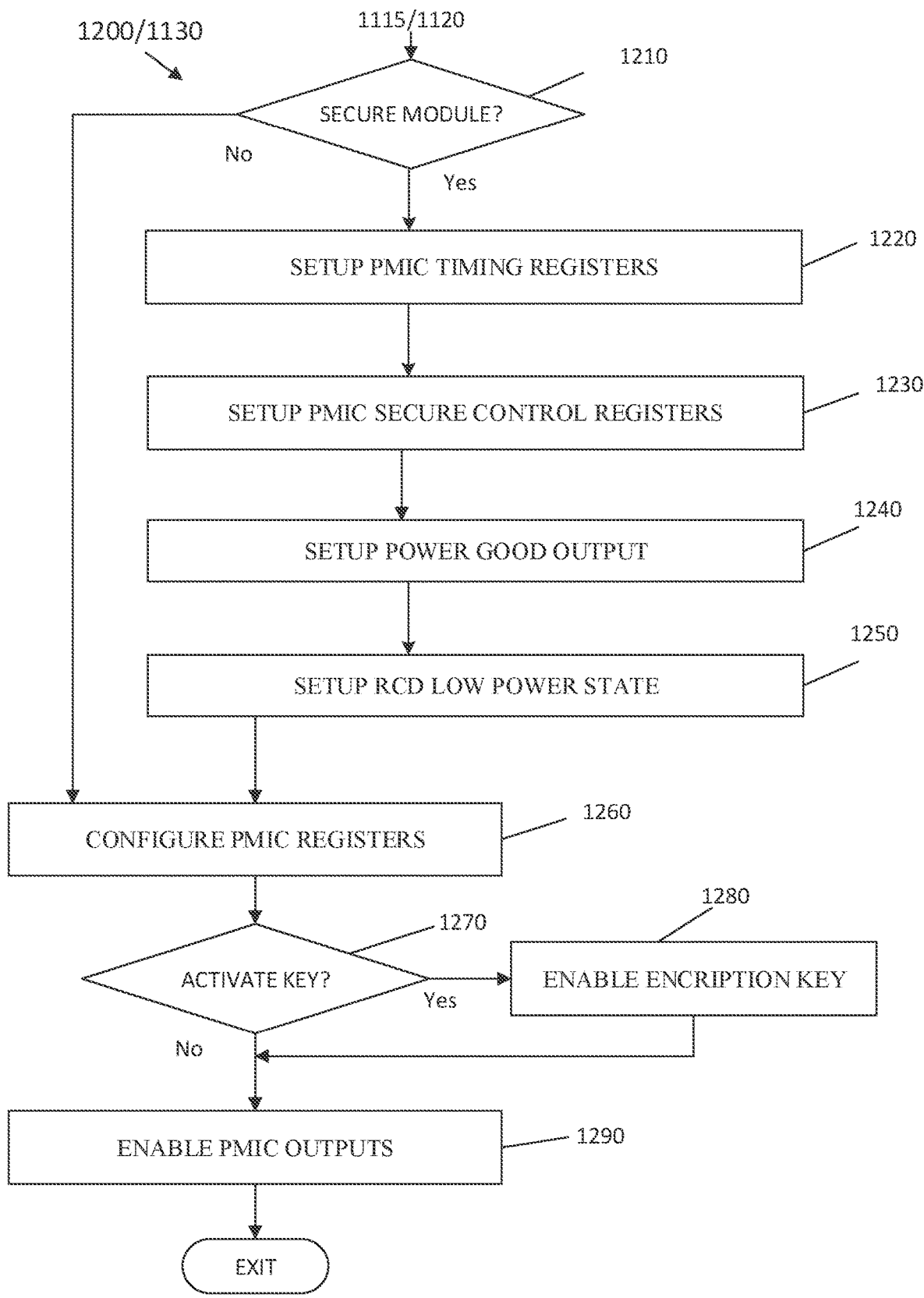
FIG. 12 is a flow diagram of a method according to an embodiment of configuring a memory module to prevent unauthorized access to its contents.

Returning to memory module configuration phase 1130, the flow chart of FIG. 12 describes process 1200, which is an embodiment of the process 1130 of configuring the memory module. While the method 1200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 12 but the process may be integrated and/or one or more steps may be performed together, simultaneously, or the steps may be performed in the order disclosed or in an alternate order. It should be appreciated that the process 1200 of configuring the memory module is typically performed every time the memory subsystem and memory module are powered up.

At 1210 the system determines whether the memory module is a secure memory module, and if the memory module is not a secure memory module (1210: No), the process continues to 1260 where the PMIC registers are configured. If the memory module is a secure memory module (1210: Yes), the process 1200/1130 continues to 1220 where the PMIC timing registers are set up. In one or more embodiments the programmable timer 1050 is set up to control the secure timing loop between the Host and the memory module. The process 1200/1130 of configuring the secure memory module continues at 1230 by setting up the PMIC secure control registers. In one or more embodiments, at 1230 the control registers 1020 in the PMIC 380 are programmed to enable the PMIC's Finite State Machine (FSM), when the encryption key is enabled, to move or transition to the Regulation State while the PMIC is in a secure operation state, e.g., the Bulk Control Link Monitor (BCLM) state with Secure Mode bit set to zero. The process 1400/1130 of configuring the secure memory module continues at 1240 where the Power Good output is set up. In one or more embodiments, at 1240 the PMIC Secure Controller or Secure Logic 1040 is programmed to control the Power Good output 1088 and the GSI_N output 1085 of the PMIC 380 to signify to the Host that the RCD 365 or Buffer 370 moved the memory to a Low Power State because the encryption key timed out. The process 1200/1130 of configuring the memory module continues at 1250 where the RCD Low Power State is set up. In one or more embodiments, at 1250, the RCD 365 is programmed to react to GSI_N output 1085 going low and the Self Refresh (SRE) and Clock Enable (CKE) going low. Alternatively and/or additionally, the Buffer 370 Low Power State is set up. In one or more embodiments, at 1250, the Buffer 370 is programmed to react to the GSI_N output 1085 going low and the Self Refresh (SRE) and Clock Enable (CKE) going low. In one or more embodiments, the Buffer 370 would be placed in a low power state via the GSI_N signal 1085, and in an aspect the Buffer 370 would place the memory, e.g., the memory devices 330, into a low power state.

After 1250 where the secure memory module is set up, or after 1210 for a non-secure memory module, the process 1200/1130 continues to 1260 where the PMIC registers are configured. In one or more embodiments, at 1260 firmware sets up the PMIC's configuration registers, sets output voltages, etc. The process 1200/1130 continues to 1270 where it is determined whether or not to activate the encryption key. If at 1270 it is determined to activate the encryption key (1270: Yes), then the process continues to 1280 where firmware enables the encryption key and the Host controller is synched to the PMIC's encryption timer 1050. After 1280, or where it is determined not to activate the encryption key (1270: No), the process 1200/1130 continues to 1290 where the PMIC outputs are enabled. In one or more embodiments, firmware sends a ready enable command to activate PMIC output voltages. The process exits the configuration process 1200/1130 after 1290 and continues with 1135 in process 1100 shown in FIG. 11.

Figure 13:
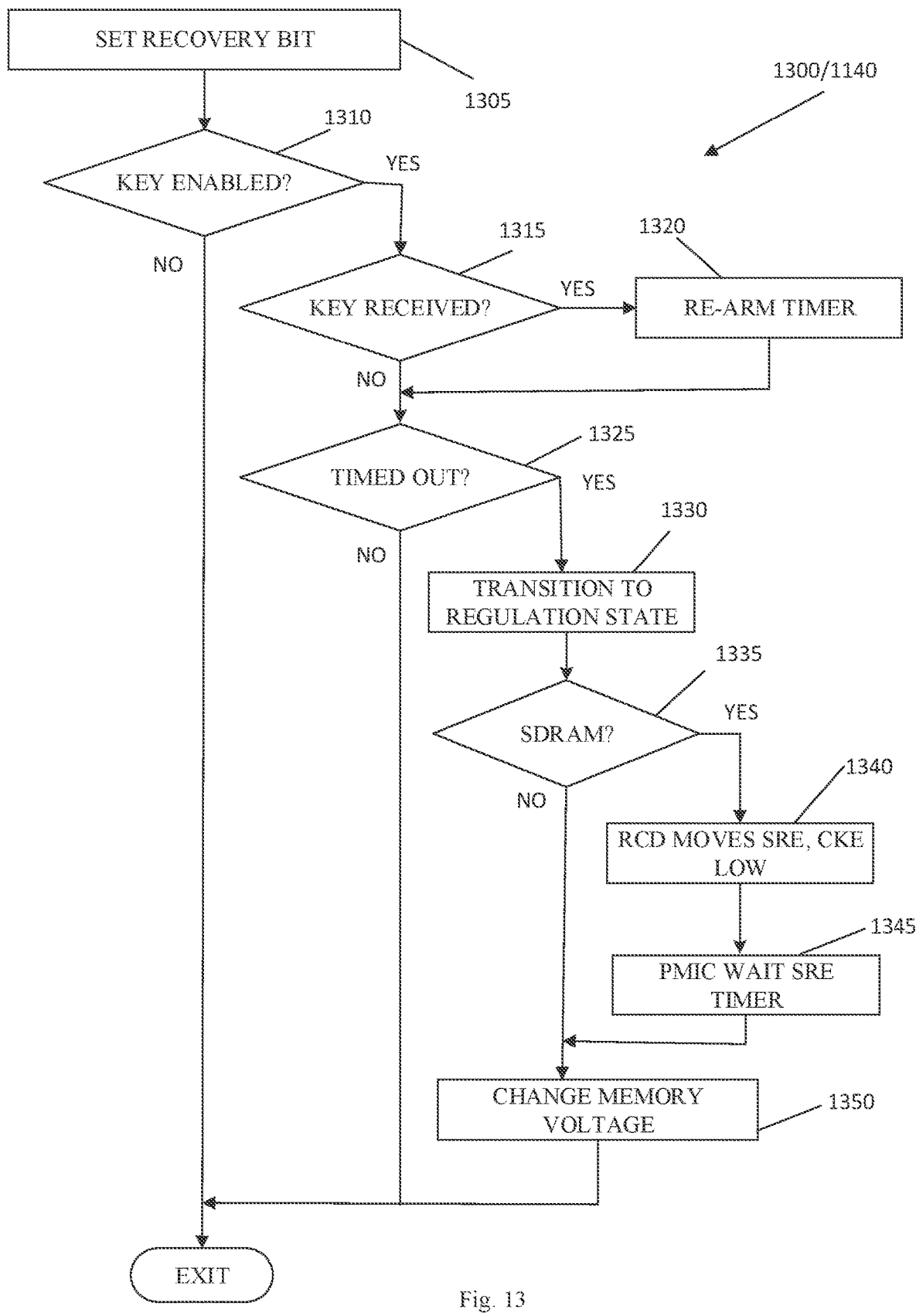
FIG. 13 is a flow diagram of a method according to an embodiment of activating a memory module to prevent unsecured or unauthorized access to its contents and the operation of the memory module.

Returning to 1140 of the process where the memory module is activated, the flow chart of FIG. 13 describes process 1300, which is an embodiment of the process 1140 of activating the memory module. While the method 1300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 13 but the process may be integrated and/or one or more steps may be performed together, simultaneously, or the steps may be performed in the order disclosed or in an alternate order. It should be appreciated that the process 1300 of activating the memory module is typically performed after the memory subsystem and memory module are powered up and the memory system performs read and write operations.

The process 1300/1140 starts at 1305 with setting the recovery bit to zero. At 1310 the system checks whether the memory module is encryption key enabled. If the memory module is not encryption enabled (1310: No), then the process 1300/1140 exits and continues to 1135 in process 1100 and checks whether or not the power is good. If at 1310 the memory module is key enabled (1310: Yes), the process continues to 1315 and determines whether or not the encryption key was received by the PMIC. In this regard, typically for secure operations the Host sends the encryption key value to the PMIC, and the PMIC checks the encryption key value sent by Host to see if it matches the encryption key stored in the PMIC register 1020. Determining whether the encryption key value received by the PMIC matches the encryption key held in the PMIC register 1020 is preferably performed by PMIC Secure Controller Logic 1040. If at 1315 the encryption key is received, e.g., the encryption key value is received and matches (1315: Yes), then the process continues to 1320 where the PMIC timer is re-set or rearmed to start again. It can be appreciated that the PMIC timer is configured during 1200/1130 when the memory modules is configured and programmed. The time period during which the PMIC should receive the encryption key can be programmed and set to any of numerous time periods, e.g., 1 second, 1 minute, 1 hour, etc. If the encryption key is not received or the encryption key received does not match the encryption key value in the PMIC register (1315: No), or after the PMIC timer is reset at 1320, the process 1300/1140 continues to 1325 where it is determined whether or not the PMIC timer has timed out, e.g., the time period has expired. During secure operations state where the host is providing the encryption key value to the PMIC, the memory module operates through 1315, 1320, and the No branch in 1325 where the PMIC encryption timer does not time out, and the memory module can perform read, write, and refresh operations.

If at 1325 it is determined that the PMIC encryption timer has timed out (1325: Yes), e.g., the proper encryption key was not received indicating a potential unauthorized access, then the process 1300/1140 continues to 1330 where the PMIC transitions to the Regulation State. In an embodiment, the PMIC 380 transitions out of secure operations state, e.g., the Bulk Control Link Monitor (BCLM) state, to the Regulation State. In an aspect, the PMIC Finite State Machine moves from the BCLM state to the Regulation state by changing the Secure Bit to 1. In one or more embodiments the PMIC upon transitioning to the Regulation state, depending upon the memory module configuration (See FIGS. 8 and 9), sends GSI_N signal 1085 to the RCD 365 and/or the Buffer 370. At 1335 the system checks whether the memory module has SDRAM memory devices, and in response to the memory module having SDRAM memory devices (1335: Yes), the process continues to 1340 where the RCD puts the DRAM into Self-Refresh Mode (SRE) and drives the clock enable (CKE) low. The process continues at 1345 where the PMIC waits for the RCD to place memory in Self Refresh (SRE) Low Power State. The process continues after 1345 to 1350, and continues after 1330 if there are no SDRAM on the memory module to 1350, where the voltage to the memory devices is changed. In one or more embodiments, the PMIC secure controller 1040 changes the voltage to the memory devices to maintain memory contents and asserts Power Good output 1088 low. In this state, where the power to the memory devices is asserted low, the contents of the memory devices on the memory module are unaccessible. After 1350, the process 1300 exits the module activated phase 1140 and proceeds to 1135 where it is determined whether the power is good. If the memory module transitioned to the Regulation State at 1330, and the Memory voltage was changed at 1350, e.g., because the PMIC 380 was not supplied with the correct encryption key, then power is not good (1135: No), and the process continues to module phase recovery at 1150.

Figure 14:
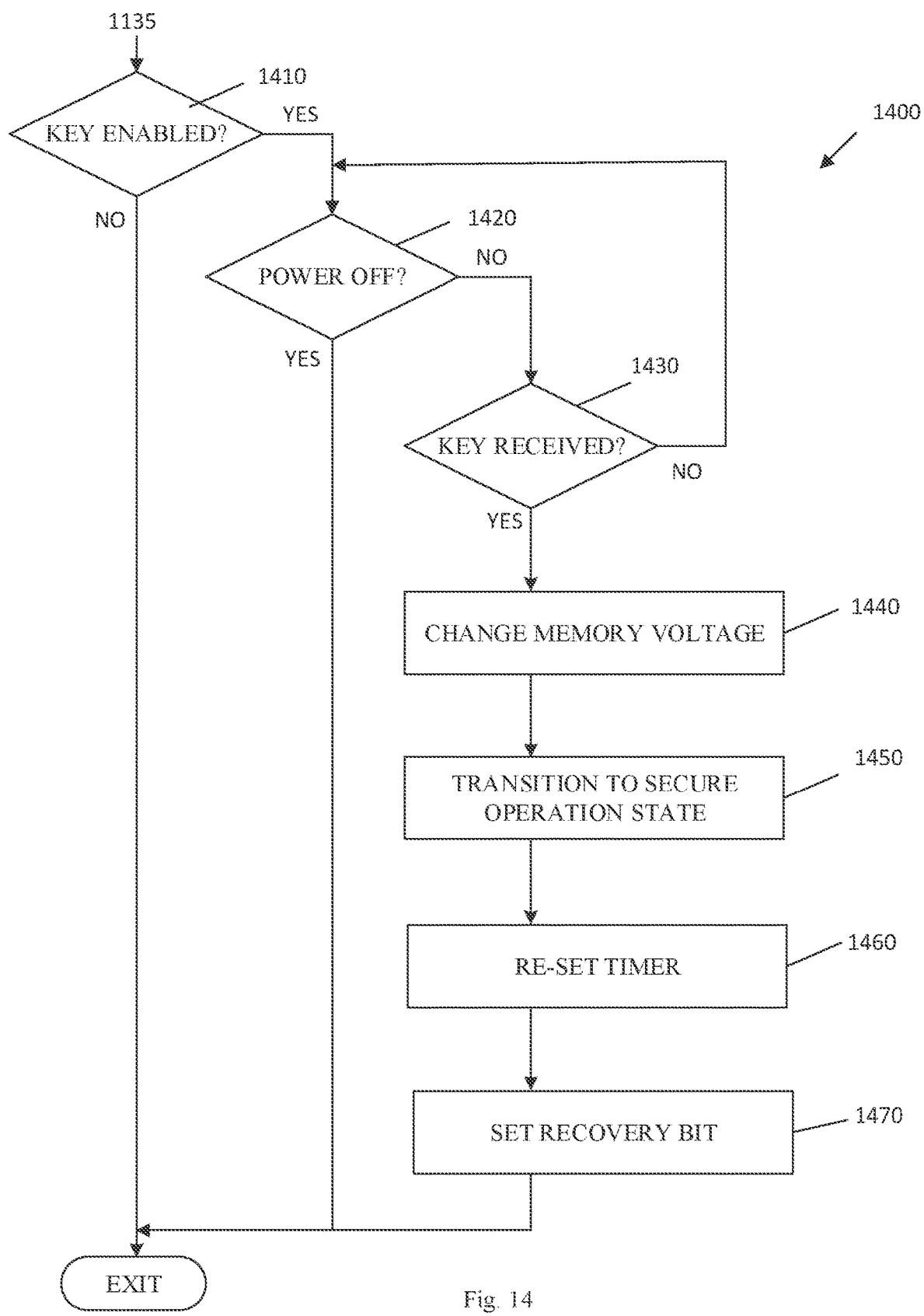
FIG. 14 is a flow diagram of a method according to an embodiment of recovering a memory module that has moved to a regulation mode to prevent unauthorized access to its contents.

The flow chart of FIG. 14 describes process 1400, which is an embodiment of memory module recovery process 1150 in FIG. 11. While the method 1400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 14 but the process may be integrated and/or one or more steps may be performed together, simultaneously, or the steps may be performed in the order disclosed or in an alternate order. It should be appreciated that the process 1400 of configuring the memory module is typically performed every time the memory subsystem and memory module are powered up.

The module recovery process 1400/1150 starts at 1410 where the system determines whether or not the memory module is encryption key enabled. If the memory module is not encryption key enabled (1410: No), then the process exits the module recovery process 1400/1150 and proceeds to 1160 where it is determined whether the recovery was successful. If the memory module is encryption key enabled (1410: Yes), the process 1400/1150 proceeds to 1420 where it is determined whether the power is off. If the power is off (1420: Yes), the process exits the module recovery process 1400/1150 and proceeds to 1160 where it is determined whether the recovery was successful. If the power to the memory module is not off (1420: No), then the process continues to 1430 where it is determined whether or not the encryption key is received. In one or more embodiments, determining whether the encryption key has been received involves determining whether the PMIC received an encryption key, e.g., an encryption key value, which matches the encryption key stored in the PMIC register 1020. If the encryption key value received by the PMIC, e.g., from the Host, matches the encryption key held in the PMIC register, then the key is considered received at 1430. If the encryption key is not received (1430: No), then the process 1400/1150 continues back to 1420 where it is determined whether the power is off. The process 1400 will stay in this loop until the encryption key is received or the PMIC, e.g., the memory module, is powered off. If the encryption key is received (1430: Yes), then the process 1400/1150 continues to 1440 where the PMIC changes the memory voltage. In one or more embodiments, the PMIC Secure Controller 1040 changes the memory voltages to activate the power settings. In an aspect, the Power Good output 1088 is asserted high and the GSI_N signal 1085 is asserted high to the RCD 365.

The process continues to 1450 where the PMIC transitions to the secure operation state. In one or more embodiments, the PMIC finite state machine (FSM) moves from the Regulation State to the Bulk Control Link Monitor (BCLM) state with Secure Mode Bit set to zero. In an embodiment, the Secure Mode bit is moved to zero. The process continues to 1460 where the encryption timer 1050 is reset. In an aspect, the PMIC reloads the encryption timer. The process continues to 1470 where the recover bit is set to 1. In an aspect, the Recovery Bit set to 1 returns the memory module to active power. After 1470 the recovery process 1400/1150 is complete and exits process 1400/1150. Upon exiting the recovery process 1400/1150 after 1470 where the recovery bit is set to 1 and active power is returned to the memory module, the process continues to 1160 from FIG. 11. At 1160, it is determined whether or not the recovery was successful, and if the recovery was successful (1160: Yes), then the process returns to 1135 where it is determined whether the power is good. Since the recovery was successful, and the power was reactivated, at 1135 the power should be good (1135: Yes), and the memory module should enter the module activated phase at 1140.

The method and techniques disclosed and illustrated would be consistent and work with DDR5 Industry Standard (IS) DIMMs that have a PMIC on the printed circuit board (PCB). The DDR5 PMIC is designed with a finite state machine (FSM) that supports a Secure Mode which requires recycling VIN bulk power (12 Volts) and VINMGNT (3.3 Volts) sources to the DIMM to exit Secure Mode. When the PMIC is placed in a Bulk Control Link Monitor (BCLM) State with the Secure Mode bit set to zero, the PMIC registers that control the four rail configurations (SWA, B, C, D) are not writeable. Essentially the user is locked out from making any voltage output adjustments that may be required. To escape the Bulk Control Link Monitor (BCLM) state the user typically has to power cycle the DIMM.

Figure 15:
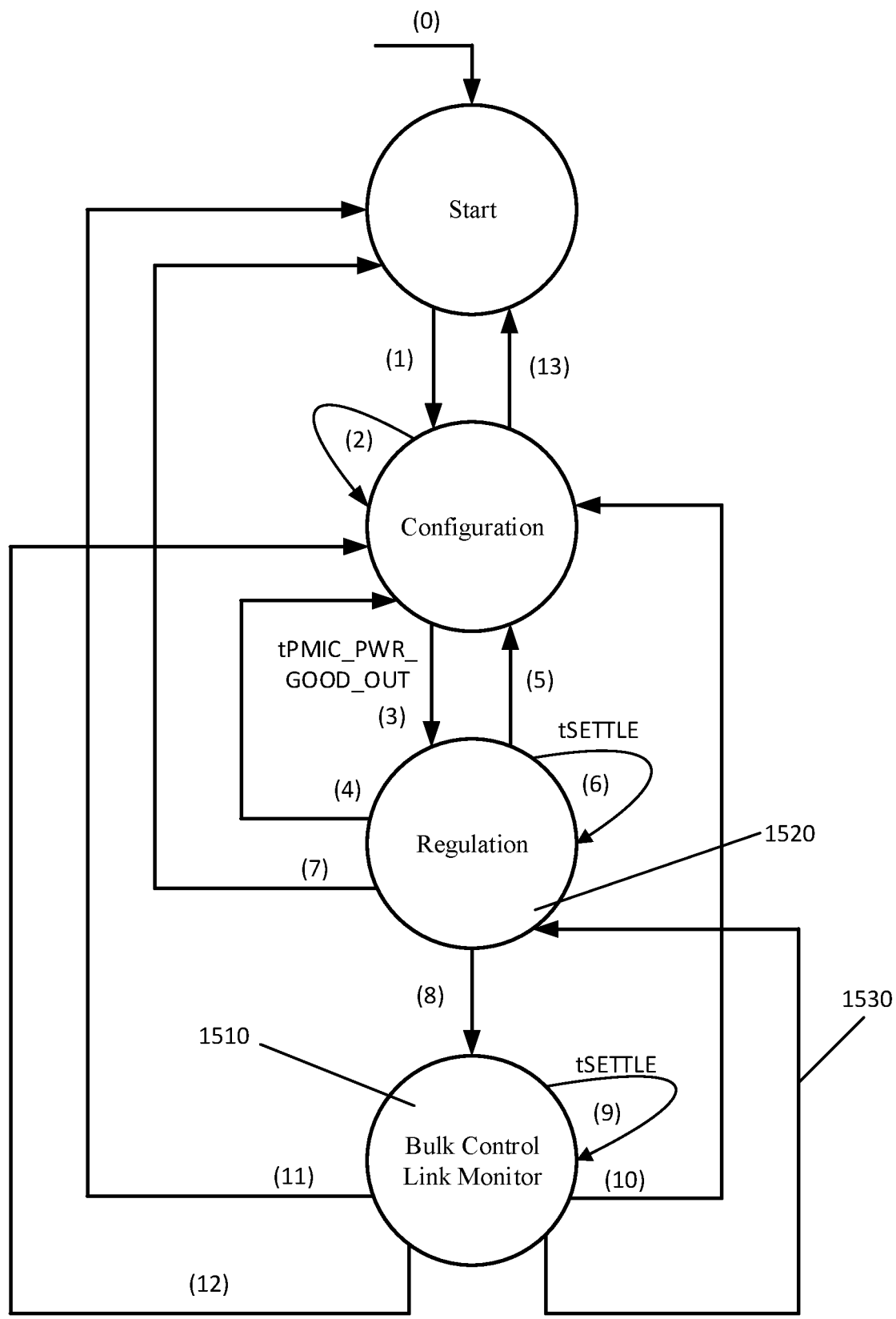
FIG. 15 shows a diagram of the high level state transitions for the PMIC Finite State Machine (FSM) according to one or more embodiments of the disclosure.

In one or more embodiments, when the PMIC's encryption register is enabled and the PMIC is placed in the Bulk Control Link Monitor (BCLM) State with Secure Mode bit set to zero, the PMIC in one or more aspects can now exit the Bulk Control Link Monitor (BCLM) state without power cycling the DIMM. The host performs a write cycle to the PMIC's encrypted register address with the encryption key value, the PMIC logic compares the write data, e.g., the encryption key value, to the contents in the encrypted register, and if the encryption key value sent by the host matches the contents of the encryption register, the PMIC FSM transitions to the Regulation state. FIG. 15 shows a diagram of the high level state transitions for the PMIC Finite State Machine (FSM). The FSM exits the Bulk Control Link Monitor (BCLM) State 1510 while in the Secure Mode and enters the Regulation State 1520 as shown by 1530 in FIG. 15 when the encryption enable bit is set to 1 indicating that the DIMM is encryption key enabled, and the encryption data received by the PMIC is matched during a write cycle to the encryption register's contents.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing data in a memory subsystem, the method comprising:
providing a memory module having one or more memory devices for storing data and a voltage regulator for controlling voltage levels supplied to the one or more memory devices, wherein the voltage regulator has a first state that permits write and read operations with the one or more memory devices, and a second state where the voltage regulator prevents at least read operations with the one or more memory devices;
storing in read only memory on the voltage regulator an encryption key value;
copying the encryption key value from the read only memory on the voltage regulator to a voltage regulator register;
setting a voltage regulator encryption timer for a period of time; and
transitioning the voltage regulator to the second state in response to the period of time of the voltage regulator encryption timer expiring.

2. The method according to claim 1, further comprising:
receiving by the voltage regulator a host encryption key from a system remote from the memory module;
comparing the host encryption key to the encryption key value in the voltage regulator register; and
in response to the host encryption key matching the encryption key value, re-setting the voltage regulator encryption timer so that the voltage regulator remains in the first state.

3. The method according to claim 1, further comprising, in response to the host encryption key not matching the encryption key value, the voltage regulator encryption timer is not reset.

4. The method according to claim 1, wherein in response to transitioning to the second state, the voltage regulator changes the voltage level supplied to the one or more memory devices to a low voltage level state rendering the data on the one or more memory devices unaccessible.

5. The method according of claim 4, wherein a voltage regulator controller changes the voltage level supplied by the voltage regulator to the one or more memory devices to the low voltage level state.

6. The method according to claim 1, wherein one or more of the one or more memory devices is volatile memory, and in response to transitioning to the second state, the data in the one or more volatile memory devices is saved to non-volatile memory.

7. The method according to claim 1, further comprising:
while the voltage regulator is operating in the second state, determining whether the voltage regulator receives a host encryption key from a system remote from the memory module;
comparing the host encryption key to the encryption key value in the voltage regulator register; and
in response to the host encryption key matching the encryption key value, transitioning the voltage regulator to the first state.

8. The method according to claim 7, further comprising, in response to transitioning the voltage regulator to the first state, changing the voltage level supplied by the voltage regulator to a second voltage level state that permits read and write operations with the one or more memory devices.

9. The method according to claim 8, further comprising, in response to transitioning the voltage regulator to the first state, the voltage regulator re-sets the voltage regulator encryption timer.

10. The method according to claim 8, further comprising, in response to transitioning the voltage regulator to the first state, resetting a recovery bit to return the voltage regulator to the second voltage level state.

11. The method according to claim 1, further comprising:
on system set-up, loading the encryption key into the voltage regulator read only memory and storing the matching encryption key value in a location remote from the memory module; and
programming the time period for the voltage encryption timer.

12. A memory system for storing data, the memory system comprising:
a memory module having at least one memory device configured to store data, the memory module having a voltage regulator having circuitry and logic for supplying voltage levels to the at least one memory device to control reading and writing operations to the at least one memory device wherein the voltage regulator has a first state that permits write and read operations with the at least one memory device, and a second state where the voltage regulator prevents at least read operations with the at least one memory device;
the voltage regulator comprising:
read only memory to store an encryption key;
a voltage regulator register for receiving and storing the encryption key from the read only memory;
an encryption timer for setting a time period;
a voltage regulator secure controller for controlling voltage levels supplied to the at least one memory device and having logic for comparing an encryption key value received by the voltage regulator to the encryption key in the voltage regulator register;
wherein the voltage regulator is configured to:
store in read only memory on the voltage regulator the encryption key value;
copy the encryption key value from the read only memory on the voltage regulator to the voltage regulator register;
set the voltage regulator encryption timer for the period of time; and
transition the voltage regulator to the second state in response to the period of time of the voltage regulator encryption timer expiring.

13. The system according to claim 12, wherein the voltage regulator is further configured to:
receive a host encryption key from a system remote from the memory module;
compare the host encryption key to the encryption key value in the voltage regulator register; and
in response to the host encryption key matching the encryption key value, re-setting the voltage regulator encryption timer so that the voltage regulator remains in the first state.

14. The system according to claim 12, wherein the voltage regulator is further configured to, in response to the host encryption key not matching the encryption key value, not reset the voltage regulator encryption timer.

15. The system according to claim 12, wherein the voltage regulator is further configured to: in response to transitioning to the second state, change the voltage level supplied by the voltage regulator to the at least one memory device to a low voltage level state rendering the data on the at least one memory device unaccessible.

16. The system according of claim 15, wherein the voltage regulator secure controller changes the voltage level supplied by the voltage regulator to the at least one memory device to the low voltage level state.

17. The system according to claim 12, wherein the at least one memory device is volatile memory, and in response to transitioning to the second state, the memory module is configured to save the data in the at least one memory device to non-volatile memory.

18. The system according to claim 12, wherein the voltage regulator is further configured to:
while the voltage regulator is operating in the second state, determine whether the voltage regulator receives a host encryption key from a system remote from the memory module;
compare the host encryption key to the encryption key value in the voltage regulator register; and
in response to the host encryption key matching the encryption key value, transition the voltage regulator to the first state.

19. The system according to claim 18, wherein the voltage regulator is further configured, in response to transitioning the voltage regulator to the first state, to: change the voltage level supplied to the at least one memory device to a second voltage level state that permits read and write operations with the at least one memory device, and
reset the voltage regulator encryption timer.

20. A memory system for storing data, the memory system comprising:
a memory module comprising a plurality of memory devices having circuitry and logic configured to store data, and a voltage regulator having circuitry and logic configured to supply voltage levels to the plurality of memory devices,
wherein the voltage regulator comprises:
read only memory to store an encryption key;
a register for receiving and storing the encryption key from the read only memory;
an encryption timer for setting a time period;
a secure controller for controlling voltage levels supplied to the plurality of memory devices and having logic for comparing an encryption key value received by the voltage regulator to the encryption key in the voltage regulator register,
wherein the voltage regulator is configured to:
supply voltage levels to the plurality of memory devices to control reading and writing operations to the plurality of memory devices wherein the voltage regulator has a first state that permits write and read operations with the plurality of memory devices, and a second state where the voltage regulator prevents at least read operations with the plurality of memory devices;
store in read only memory on the voltage regulator the encryption key value;
copy the encryption key value from the read only memory on the voltage regulator to the voltage regulator register;
set the voltage regulator encryption timer for the period of time;
receive a host encryption key from a system remote from the memory module;
compare the host encryption key to the encryption key value in the voltage regulator register;
in response to the host encryption key matching the encryption key value, re-set the voltage regulator encryption timer so that the voltage regulator remains in the first state;
in response to the host encryption key not matching the encryption key value, not re-setting the voltage regulator encryption timer;
in response to the period of time that the encryption timer is set to run expiring, transition the voltage regulator to the second state; and
in response to transitioning to the second state, the voltage regulator changes the voltage level supplied by the voltage regulator to the plurality of memory devices to a low voltage level state rendering the data on the plurality of memory devices unaccessible.

* * * * *